US012639695B2

(12) United States Patent
DeFazio et al.

(10) Patent No.: US 12,639,695 B2
(45) Date of Patent: May 26, 2026

(54) SYSTEM AND METHOD FOR PROVIDING PROXIMITY-BASED INDICATORS

(71) Applicant: Shopify Inc., Ottawa (CA)

(72) Inventors: Michael Joseph DeFazio, Fonthill (CA); Theresa Jia Ying Zeng, Richmond Hill (CA)

(73) Assignee: Shopify Inc., Ottawa (CA)

( * ) Notice: Subject to any disclaimer, the term of this patent is extended or adjusted under 35 U.S.C. 154(b) by 197 days.

(21) Appl. No.: 18/364,800

(22) Filed: Aug. 3, 2023

(65) Prior Publication Data

US 2025/0045724 A1     Feb. 6, 2025

(51) Int. Cl.
*G06Q 30/00* (2023.01)
*G06Q 20/32* (2012.01)

(52) U.S. Cl.
CPC .................................. *G06Q 20/327* (2013.01)

(58) Field of Classification Search
CPC .................................................... G06Q 20/327
USPC ........... 705/39, 1.1, 44, 38, 41, 26.8, 14.27; 235/487, 384; 455/41.1, 426
See application file for complete search history.

(56) References Cited

U.S. PATENT DOCUMENTS

| | | | |
|---|---|---|---|
| 9,135,612 B1 * | 9/2015 | Proctor, Jr. ........ | G06Q 20/4015 |
| 11,334,889 B2 * | 5/2022 | Fernandez ......... | G06Q 20/0457 |
| 2007/0030824 A1 * | 2/2007 | Ribaudo ................ | H04L 51/52 |
| | | | 370/328 |
| 2010/0113013 A1 * | 5/2010 | Karabinis ............... | H04W 4/02 |
| | | | 705/26.1 |

OTHER PUBLICATIONS ip.com NPL Search History.*

* cited by examiner

*Primary Examiner* — John H. Holly
(74) *Attorney, Agent, or Firm* — CPST Intellectual Property Inc.; Brett J. Slaney

(57) ABSTRACT

A system and method are provided for providing proximity-based indicators of other devices engaged in checkout transactions. The method includes causing a second device to be locatable by a first device while the second device is being used to complete a checkout transaction; and at the first device, displaying a list comprising an entity associated with the second device, the second device operable to communicate with the first device. The entity in the list associated with the second device comprises an indication of proximity of that entity to the first device, determined based on a proximity value for the second device.

25 Claims, 14 Drawing Sheets

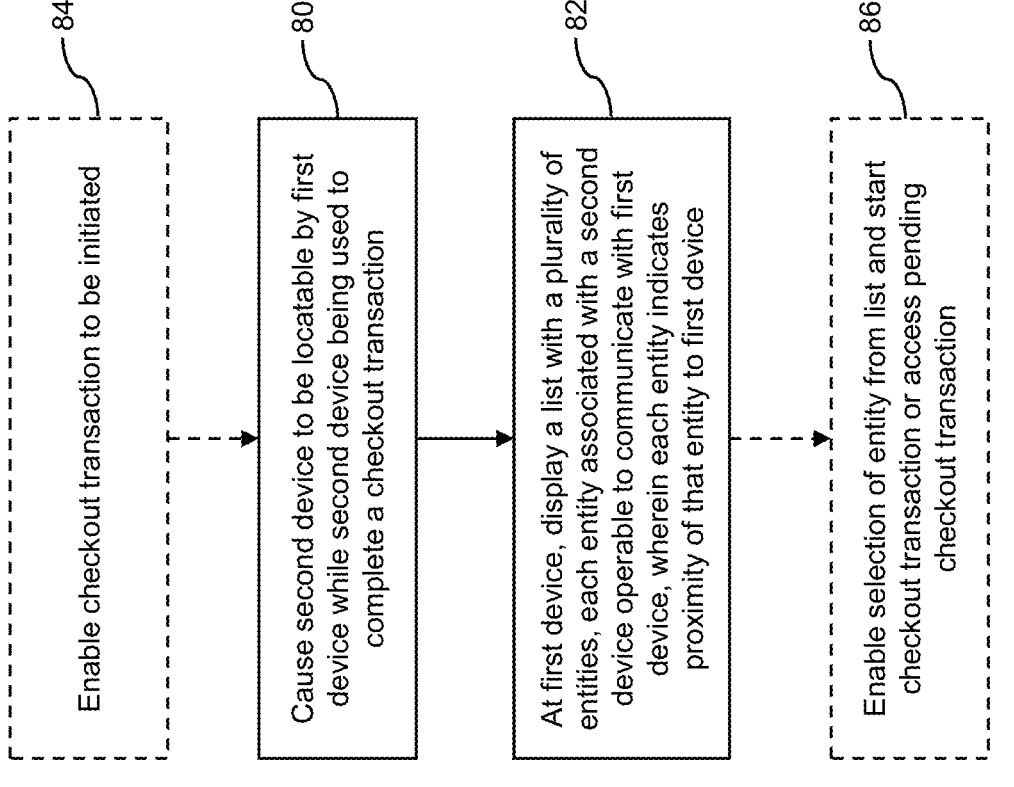

84 — Enable checkout transaction to be initiated

80 — Cause second device to be locatable by first device while second device being used to complete a checkout transaction 82 — At first device, display a list with a plurality of entities, each entity associated with a second device operable to communicate with first device, wherein each entity indicates proximity of that entity to first device 86 — Enable selection of entity from list and start checkout transaction or access pending checkout transaction

FIG. 4

SYSTEM AND METHOD FOR PROVIDING PROXIMITY-BASED INDICATORS

TECHNICAL FIELD

The following generally relates to proximity-based indicators, particularly, proximity-based indicators for devices engaged in transactions and, more particularly, to providing proximity-based indicators in user interfaces used in executing such transactions.

BACKGROUND

Transaction processes may include, for example, checkout transactions. Such checkout transactions may include steps that involve interactions between individuals and certain devices used by those individuals to participate in the transaction. In some cases, the interactions may include interactions with third party entities, e.g., entities used in performing verification steps. These interactions may be time consuming and may slow down the checkout process.

BRIEF DESCRIPTION OF THE DRAWINGS

Embodiments will now be described with reference to the appended drawings wherein:

FIG. 4 is a flow chart illustrating example operations for displaying a list of entities operable to communicate with a computing device, each entry in the list indicating a proximity of that entity to the computing device.

DETAILED DESCRIPTION

Figure 1:
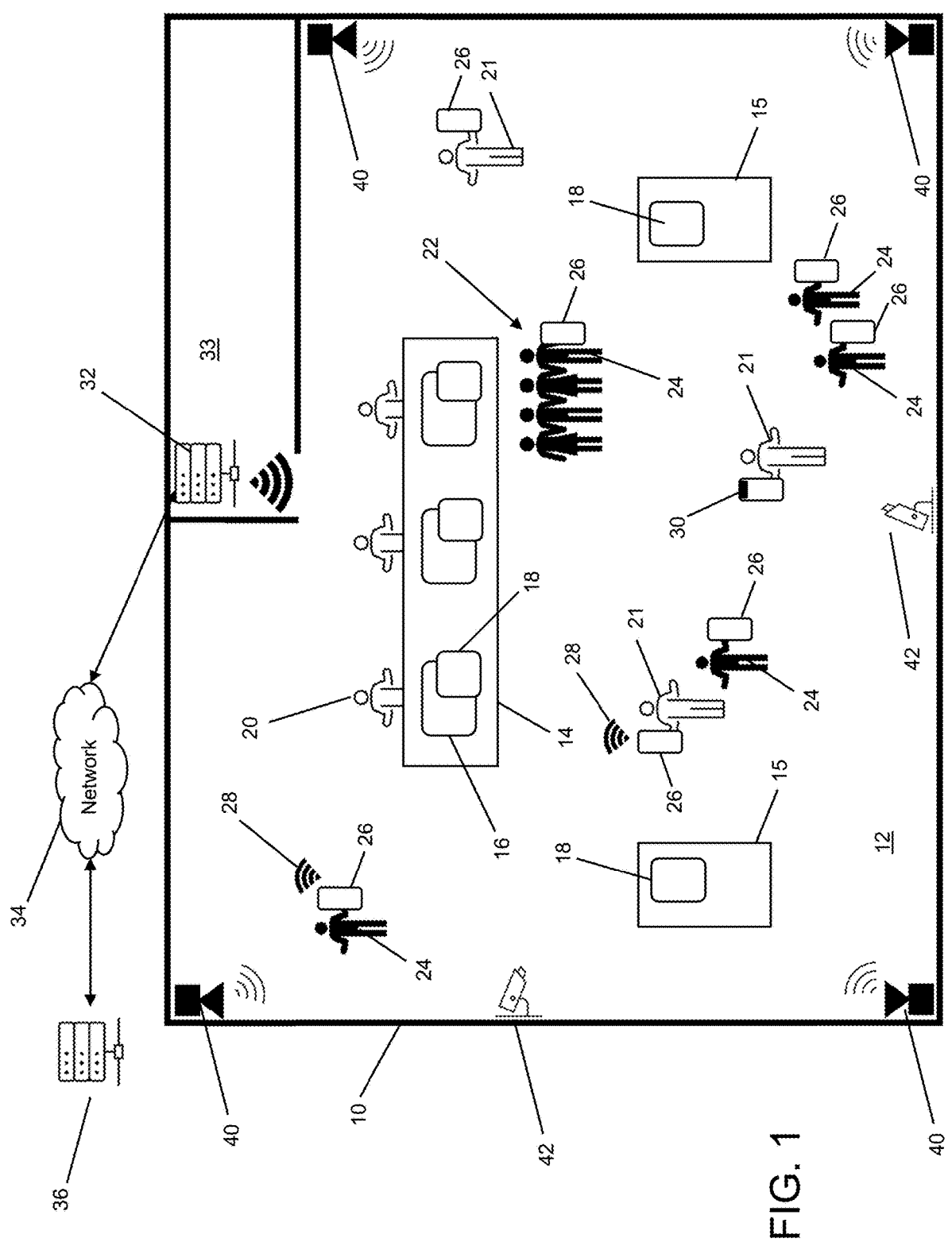
FIG. 1 is a schematic plan view of an example of a retail environment.

Transactions that involve obtaining one or more items from an individual or entity may include checking out or executing checkout transactions. Checkout transactions as referred to herein may refer to transactions that occur at or near the end of a transaction whose objective is to obtain the items, e.g., for purchase, to borrow, or to otherwise acquire or obtain. Checkout transactions are common in retail environments and may occur one at a time by serving individuals in a queue or line. These transactions may involve a number of steps, including, for example, scanning, de-tagging, folding, coupon/discount entry, loyalty or other reward entry (or sign up for new customers), and payment. Subsequent to payment, notifications may be sent to the individual, e.g., to fill out a survey or join the loyalty program (if not already). The payment step may include payment deferral options that involve interacting with third party entities for verification purposes, e.g., credit checks, pre-qualifying for installments, or entering ship-to-home details. A checkout transaction that involves multiple steps such as those mentioned above may be time consuming and lead to large numbers of individuals being held in the line while those ahead of them are served.

In many retail environments, it is common for UIs displayed by electronic devices, e.g., point of sale (POS) devices, to be used to execute checkout transactions. These POS devices may be integrated into a checkout computer or tablet or be embodied as a handheld device such as a payment machine. Line busting is a term that has been used to describe the act of sending staff with handheld POS devices away from a fixed counter where traditional POS transactions take place. The staff may use the handhelds to perform some or all of the customer checkout steps. While line busting may help to alleviate long lines at checkout, some processes still take a long time to enter forms and exchange data, which slows down the checkout process. That is, staff that use POS devices for line busting may experience similar delays and could benefit from the ability to multitask while assisting customers that have been removed from the line or are not in the line to begin with.

For certain checkout processes, for example, where registrations and/or third party validations (e.g., credit checks, pre-qualifying for installments, or entering ship-to-home details) are required, a handoff from an employee device to a user device can allow the customer to enter information themselves. Some processes take a relatively long time to complete, such as credit checks or loan/payment plan authorizations. In these cases, there is an opportunity for the employee to multitask based on proximity while these operations are completed asynchronously. Providing a UI that allows the employee to multitask by assisting multiple customers asynchronously may introduce efficiencies into relatively more complex checkout procedures.

A UI is described herein that provides a list of entities (e.g., list of customers) in a detectable and locatable physical area, which entities are currently engaged in (or may begin to be engaged in) a transaction process such as a retail checkout transaction. The list of entities may provide an indication of proximity, with such proximity providing a measure of distance and/or a measure of direction, advantageously both. The UI may change based on the current proximity of the user devices used by the entities in the list. In this way, more efficient management of a list of customers may be achieved in parallel or asynchronous transaction sessions (e.g., checkouts) by using one or more proximity values (e.g., distance and direction) along with a state of the transactional process (e.g., a customer's checkout state).

In one aspect, there is provided a computer-implemented method, comprising: causing a second device to be locatable by a first device while the second device is being used to complete a checkout transaction; and at the first device, displaying a list comprising an entity associated with the second device, the second device operable to communicate with the first device; wherein the entity in the list associated with the second device comprises an indication of proximity of that entity to the first device, determined based on a proximity value for the second device.

In certain example embodiments, the proximity value comprises a distance of the second device relative to the first device.

In certain example embodiments, the proximity value comprises a direction of the second device relative to the first device.

In certain example embodiments, the proximity value comprises a direction of the second device relative to the first device.

In certain example embodiments, the list is ordered based at least in part on proximity values of a plurality of entities.

In certain example embodiments, the method further comprises: reordering the list based on the proximity value as the relative locations of the first device and any one of the plurality of entities changes.

In certain example embodiments, the method further comprises: exchanging data between the first device and the second device to conduct a next step in the checkout transaction.

In certain example embodiments, the method further comprises: responsive to an input at the first device selecting the entity in the list, sending a notification from the first device to the second device to initiate the checkout transaction.

In certain example embodiments, the method further comprises: displaying a transaction checkout user interface associated with the entity in the list when detecting selection of that entity from the list.

In certain example embodiments, the proximity value is determined by any one or more of the first device, the second device, or a third device operable to determine the proximity of the second device.

In certain example embodiments, each entity becomes visible on the list when running an application on the second device.

In certain example embodiments, the list is further displayed on at least one additional device, wherein the proximity value for each entity displayed on the at least one additional device is based on a location of the second device relative to the corresponding additional device.

In certain example embodiments, the method further comprises: filtering the list displayed on the first device and each additional device to display a subset of the entities, based on a role associated with the corresponding device.

In certain example embodiments, the list is ordered based at least in part on a stage of the checkout transaction being completed between the first device and a corresponding one of a plurality of second devices.

In certain example embodiments, the proximity value is determined using an Ultra Wide Band (UWB).

In certain example embodiments, a plurality of second devices are locatable by the first device while each of the plurality of second devices is being used to complete the checkout transaction, wherein each entity is associated with a corresponding second device operable to communicate with the first device, and wherein a plurality of indications of proximity are provided, based on a proximity value for the corresponding second device.

In another aspect, there is provided a system comprising: at least one processor; and at least one memory. The at least one memory stores processor executable instructions that, when executed by the at least one processor, causes the system to: cause a second device to be locatable by a first device while the second device is being used to complete a checkout transaction; and at the first device, display a list comprising an entity associated with the second device, the second device operable to communicate with the first device; wherein the entity in the list associated with the second device comprises an indication of proximity of that entity to the first device, determined based on a proximity value for the second device.

In certain example embodiments, the proximity value comprises a distance of the second device relative to the first device and/or a direction of the second device relative to the first device.

In certain example embodiments, the list is ordered based at least in part on proximity values of a plurality of entities.

In certain example embodiments, the system further comprises instructions to: reorder the list based on the proximity value as the relative locations of the first device and any one of the plurality of entities changes.

In certain example embodiments, the system further comprises instructions to: exchange data between the first device and the second device to conduct a next step in the checkout transaction.

In certain example embodiments, the list is further displayed on at least one additional device, wherein the proximity value for each entity displayed on the at least one additional device is based on a location of the second device relative to the corresponding additional device.

In certain example embodiments, the system further comprises instructions to: filter the list displayed on the first device and each additional device to display a subset of the entities, based on a role associated with the corresponding device.

In certain example embodiments, a plurality of second devices are locatable by the first device while each of the plurality of second devices is being used to complete the checkout transaction, wherein each entity is associated with a corresponding second device operable to communicate with the first device, and wherein a plurality of indications of proximity are provided, based on a proximity value for the corresponding second device.

In another aspect, there is provided a computer-readable medium storing processor executable instructions that, when executed by a processor, cause the processor to cause a second device to be locatable by a first device while the second device is being used to complete a checkout transaction; and at the first device, display a list comprising an entity associated with the second device, the second device operable to communicate with the first device; wherein the entity in the list associated with the second device comprises an indication of proximity of that entity to the first device, determined based on a proximity value for the second device.

The proximity values for the devices being used by the entities may be determined using a suitable location-based system. For example, UWB technologies may be used to provide both distance and directionality between two entities. For example, a UWB system may provide an employee's checkout or other POS UI with proximity values (e.g., distance and direction) to enable the employee to determine which customer devices are nearby and in what direction they are located, to facilitate re-engaging with that customer during a multi-stage checkout. Other location-based systems may be used, for example, triangulation techniques using WiFi connections, personal area technologies such as Bluetooth Low Energy (BLE) systems, a global positioning system (GPS), vision systems (based on camera feeds in the physical area), etc.

The proximity values may be used to periodically (or continuously) update the UI list, which may also permit the list to be reordered based on changing proximities. Moreover, other signals may be used to dynamically reorder the list, for example, a stage in a checkout (or other workflow) session. The user interface may also include a user identifier such as a customer's name. Additional information concerning that user may also be displayed or be accessible via the UI, e.g., directly from an entry in the list of entities.

For example, each customer in a retail establishment may be displayed in the list by opting in to provide information when running a particular application (e.g., for the retail establishment or a payment provider). The employee may then determine additional details about that customer either before or during the checkout process. For customers visible on the list but not yet engaged in a transaction process (e.g., a customer that just enters the retail establishment), the employee can determine information about that customer, initiate a push notification to that customer regarding sales, promotions or to welcome the individual to the store and offer their assistance. This same customer may remain in the UI list through the entire experience, for example, up to and including a checkout process whether at a checkout counter or a portable POS device that is used for line busting or to asynchronously handle multiple complex processes as discussed above.

An example is provided below based on a retail experience. From the merchant's perspective, the UI provided to them may be used to multitask both in-progress and yet-to-be-initiated transaction workflows with multiple customers. For example, a handoff process may be implemented, wherein the employee is waiting for one customer to complete a part of the process and is prompted or can select an option to assist another customer.

An option to perform the handoff may be displayed on the employee's handheld device. While the above stage of the process is pending, the employee may navigate back to a multitasking list, which shows a list of customers in various stages of a checkout process. This list may also be populated with customers in proximity but not in the checkout process providing the employee with opportunities to engage with nearby customers for assistance or to initiate such a checkout process.

In this example, entries in the list identify the customer (if possible) and provide an indication of proximity, which may provide, where available, both a distance measure and a directionality measure. This allows the employee to more easily find and re-engage with specific customers. This list may be reordered based on the proximity values and/or the stage of the checkout process, e.g., such that customers waiting for the employee to perform the next action may be surfaced to the top even if they are located physically further from the employee than others.

Checkouts may include, for example, draft orders, saved carts, or similar constructs. The checkout processes may be facilitated by a POS app used by the employee that is in communication with an application running on the customer's device, e.g., a payment provider or merchant/store app. The proximity measures may be determined periodically or continuously using an available location-based technology such as UWB. For example, customer devices may be UWB-enabled while beacons are placed within the retail establishment to communicate with the customer devices to establish measures of location and directionality relative to other devices in the same area. This allows the employee UI to be updated as customers and other employees move around the area. The employee may select an entity from the list to obtain more information about the customer, initiate a communication such as a push notification, enter into a new or ongoing checkout process, etc.

From the perspective of the customer, the application they are using in the retail establishment may be used to grant the merchant access to the location of the customer, e.g., for the duration of the transaction or shopping experience. The customer app and the merchant app used by the employee may be paired when engaged in the checkout process (e.g., via near field communication (NFC) tap, quick response (QR) code or another method).

The customer device may respond to location requests or ranging requests from the merchant device or an in-store network infrastructure while the customer app is in a checkout in-progress state. (e.g., UWB, BLE, IEEE 802.11, vision, WiFi, GPS, or similar technologies as noted above). Once the checkout has entered a completed state the customer app may cease providing location or responding to location requests unless permission is granted by the customer to continue providing this information while they remain in the retail establishment.

For example, the employee may be able to follow up with the customer to fill out a survey, provide a gratuity/tip (in some types of retail environments) or to provide recommendations for further shopping or the next shopping experience. That is, if the customer permits further engagement (e.g., by continuing to run the app), follow-up actions are possible both while the customer is in the retail establishment or in a nearby area and elsewhere such as when the customer returns home.

Turning now to the figures, FIG. 1 illustrates an example of a retail environment 10 such as a retail store, convention hall, pop-up retail site, restaurant or other retail establishment, having a retail area 12 (i.e., area designated in a retail store to display and sell products, provide customer service and checkout) in which customers 24 (designated with darkened figures) can move about along with staff or other users of the retail establishment (e.g., employees). For example, it is typical for a retail store to have a showroom or other retail area 12 displaying goods being sold at that store. Similarly, a restaurant may include a number of tables set about the retail area 12 for customers to be seated for eating. While these examples are in the context of a retail environment, the principles illustrated can be applied in other settings where multiple staff are available to assist multiple individuals that wish to engage in a transaction such as a checkout transaction.

In the example shown in FIG. 1, the staff shown include fixed checkout employees 20, assigned to a main or primary retail counter 14; and mobile or roaming employees 21, which may be assigned to secondary retail counters 15 or may roam the retail area 12 for assisting customers 24 with questions, attending to merchandise or, as described herein, for assisting with line busting or other secondary checkout processes. Fixed checkout employees 20 may also be roaming employees 21 in other scenarios and would not necessarily have fixed roles. In this example, the primary checkout counter 14 is provided with a number of checkout stations 16. Each checkout station 16 in this example includes checkout/payment equipment such as a checkout device 18 to permit employees to assist customers 24 that have formed a checkout line 22. Similarly, a pair of secondary retail counters 15 are shown, which may also operate as checkout counters or may be used for customer service or other operations within the retail environment 10 such as returns. As illustrated in FIG. 1, the secondary retail counters 15 may include a checkout device 18. Such checkout devices 18 may include one or more electronic devices such as cash registers, POS devices, tablet computers, laptop computers or other computing devices that have been configured to perform one or more retail operations such as to execute a checkout process.

In this example, each individual (e.g., customers 24 and employees 20, 21) may have and utilize a computing device 26. While each individual is shown as having a similar computing device 26, it can be appreciated that the computing devices 26 referred to herein are meant to broadly capture any personal computing/communication or other electronic device. In this example, the form factor illustrated resembles a smartphone or tablet device as the computing device 26. However, such computing devices 26 can generally include, but are not limited to, a mobile phone, a personal computer, a laptop computer, a tablet computer, a notebook computer, a hand-held computer, a personal digital assistant, a portable navigation device, a wearable device, a gaming device, an embedded device, a smartphone, a virtual reality device, an augmented reality device, etc.

As discussed further below, the computing devices 26 may utilize a merchant application 70 (e.g., see FIG. 4), which may generally refer to any application that is used and provided by a merchant (or store) associated with the retail environment 10 and may include both a staff version and a customer version. That is, the merchant application 70 may be configurable to allow staff to perform staff-related duties such as checkout processes, which interact with a merchant application 70 running on a customer's computing device 26. For example, the merchant associated with the retail environment 10 may have an app that allows the customer 24 to save profile and payment information, associate a loyalty memberships, shop online, among other things.

The devices 26 shown in FIG. 1 may include at least one communication capability, including both short-range (e.g., Bluetooth, NFC, infrared, UWB, BLE) and long-range (e.g., WiFi, cellular) communication modules. In this way, the devices 26 may have the ability to communicate with each other using any available wireless communication medium 28. It can be appreciated that a computing device 26 may include multiple merchant applications 70, with one adapted to operate as an employee 20, 21 and another adapted to operate as a customer 24. That is, the merchant application 70 and computing devices 26 may refer generally to devices that provide multiple types of functionality in different configurations such that a staff member 20, 21 may at other times be considered a customer 24 (and vice versa).

The retail environment 10 in FIG. 1 also includes a backroom, employee lounge or other separate area 33 from the retail area 12. In this example, the separate area 33 includes a backroom with a local network device 32 used to pair, group, and track the devices 26 by communicating with at least some of the devices 26, e.g., by providing a WiFi network. In a closed local system, the network device 32 may include a local server. In a cloud-based or other remote server configuration, the local network device 32 may include a router or hub that connects locally to the devices 26, and to a cloud-based server 36 accessible via one or more communication networks 34. For ease of reference, either or both devices 32, 36 may be referred to herein as a server, server device, cloud-based server, or network device interchangeably. Such communication network(s) 34 may include a telephone network, cellular, and/or data communication network to connect different types of client- and/or server-type devices. For example, the communication network may include a private or public switched telephone network (PSTN), mobile network (e.g., code division multiple access (CDMA) network, global system for mobile communications (GSM) network, and/or any 3G, 4G, or 5G wireless carrier network, etc.), Wi-Fi or other similar wireless network, and a private and/or public wide area network (e.g., the Internet).

The local server 32 is one example of a communication medium 38 that may be used to determine the presence of customers 24 and employees 20, 21 via usage of their devices 26. For example, by joining a store WiFi network while in the retail area 12, the customers 24 and employees 20, 21 may opt-in to receiving communications from the merchant and/or to be tracked while in the retail area 12 for the purpose of enhanced staff assistance. Similar opt-ins or settings may be utilized by the merchant application 70 such that the customer 24 may be locatable while the application 70 is running. Similarly, settings may allow a customer 24 to be locatable only when present within a retail area 12 and not otherwise.

While WiFi may be used as a local communication medium for exchanging data, it may also be adapted to determine location data by using WiFi pods or other access points to determine where in the retail area 12 the particular computing device 26 may be located. In this example, other location-based tracking systems are illustrated. A set of UWB beacons 40 are placed in the corners of the retail area 12 in this example, to illustrate that a UWB system may be set up in the retail area 12 by the merchant to facilitate the determination of both distance and directionality of one computing device 26 to another computing device 26 that is located in the retail area 12. In another example, a set of one or more surveillance cameras 42 positioned and oriented to observe the retail area 12, e.g., for security surveillance, may also provide video footage that can be used to estimate a distance and directionality of one computing device 26 relative to another computing device 26. As indicated above, any available location-based systems may be used, for example, triangulation techniques using WiFi connections, personal area technologies such as BLE systems, GPS, vision systems (based on camera feeds in the physical area), etc.

FIG. 1 illustrates that a computing device 26 may include a tag 30 or other component that is used to assist in locating that device 26. The tag 30 may include, for example a UWB tag. Such a tag 30 may be locatable using the UWB beacons 40 or may emit a signal that is capable of being located using another communication medium 28. As such, it can be appreciated that any available location tracking mechanism may be employed. Moreover, it can also be appreciated that computing devices 26 may employ different location-tracking mechanisms depending on the capabilities of that device 26. For example, one computing device 26 may be UWB-enabled while another is only locatable via a WiFi connection or by being locatable from images taken in security camera footage. As such, the proximity-aware UI features described herein may be adaptable to obtain the "best available" data from each computing device 26 that is locatable within the retail area 12. Short-range communications such as NFC tap operations between employees 20, 21 and customers 24 may also be used to initiate peer-to-peer connections with customers 24 whose computing device 26 is not currently locatable in the retail area 12. For example, an NFC tap operation may be used to initiate sending of a notification to prompt the customer 24 to turn on location-tracking for their merchant application 70 or to have then open the merchant application 70 to begin with.

Figure 2:
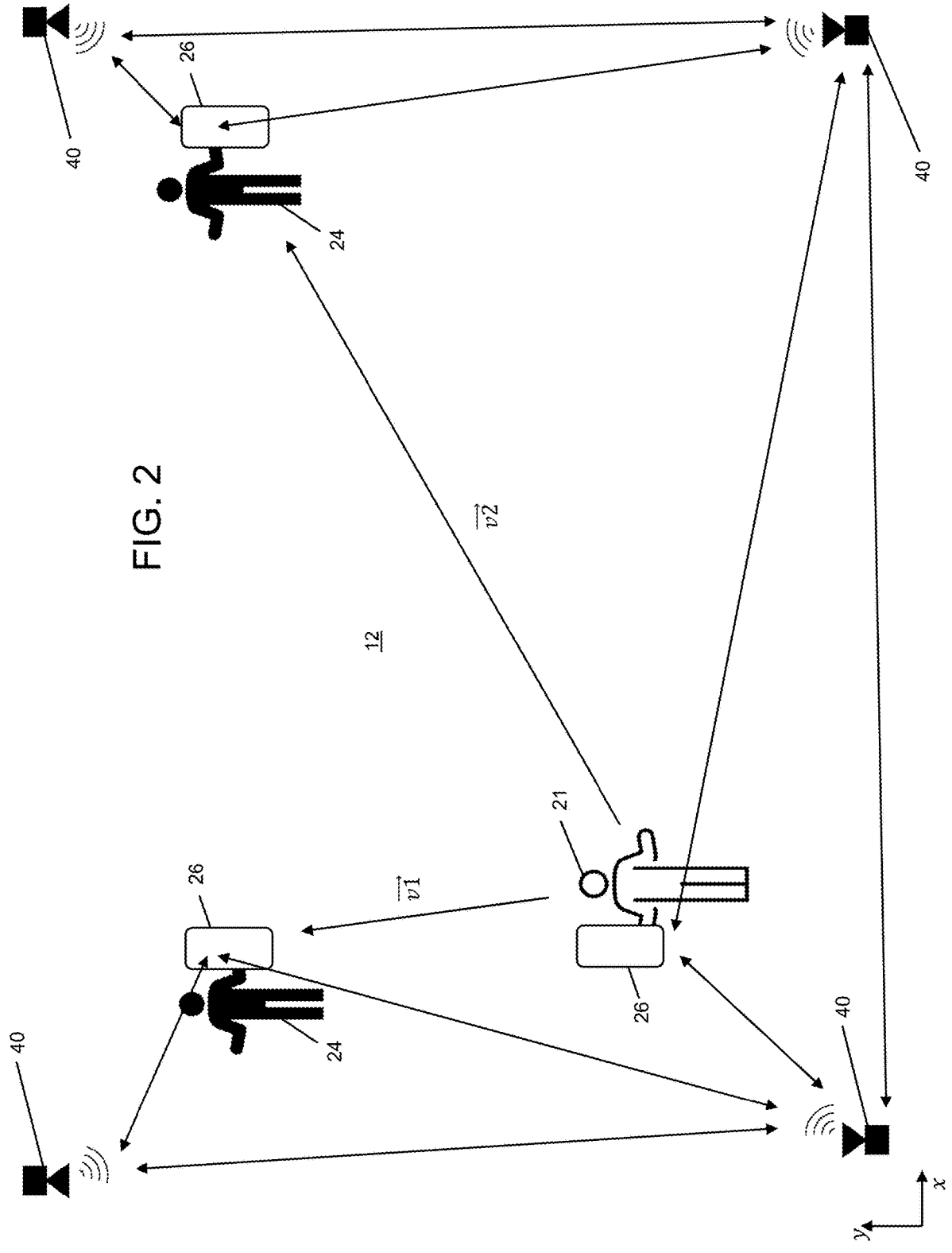
FIG. 2 is an example of a proximity tracking system utilized in a tracked environment such as the retail environment shown in FIG. 1.

FIG. 2 illustrates an example of a UWB-based location tracking system that may be utilized to determine both distance and directionality of customers 24 and a roaming employee 21. In this example, by determining distance values relative to a pair of UWB beacons 40 and a known distance between the beacons 40, a computing device 26 may be located within the retail area 12, e.g., by a measured (x, y) pair according to a Cartesian coordinate system applied to the layout of the retail area 12. By locating both the employee 21 and the customers 24, vectors (v) may be established between the employee 21 and each customer 24. In this example, $\overrightarrow{v1}$ and $\overrightarrow{v2}$ may be computed to enable the merchant application 70 utilized by the employee 21 to display proximity values that indicate both a distance between them and each customer 24 as well as an indication of directionality. This allows the merchant application 70 to provide the employee 21 with a more accurate indication of where they can find the specific customer 24 within the retail area 12 in order to engage (or re-engage) with them. For example, during a relatively complex checkout transaction process having at least one time consuming step, the employee 21 may be able to shift between multiple checkout processes with respective customers 24 to multitask and introduce efficiencies into the checkout process. While FIG. 2 illustrates the use of UWB beacons 40 to locate the individuals, any suitable triangulation or location tracking system may be used. For example, an image or video showing the same individuals illustrated in FIG. 2, may be used to identify a location thereof by using image processing techniques to estimate locations based on measurements relative to known points, such as the corners, a checkout counter 14, 15, etc.

Figure 3:
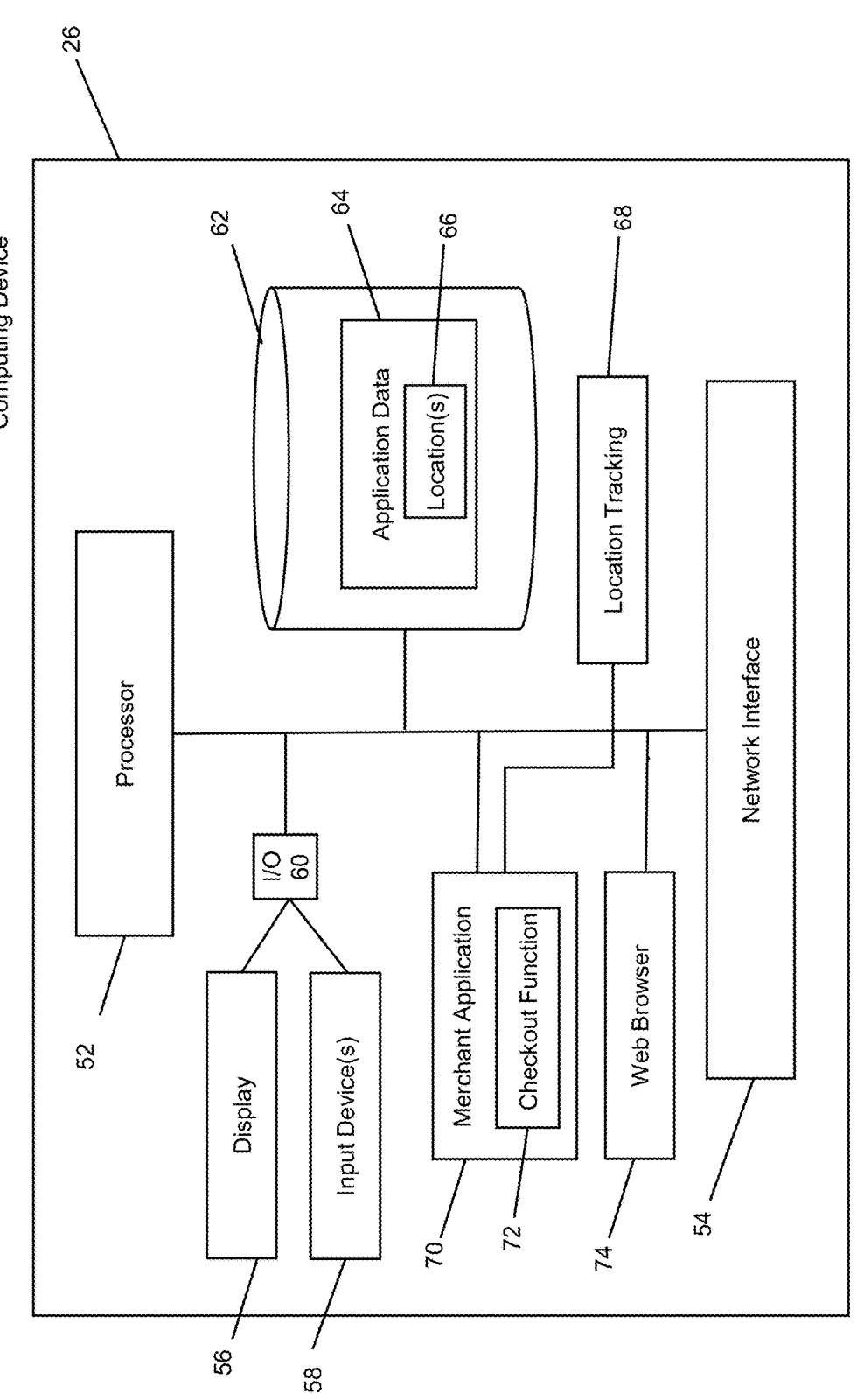
FIG. 3 is an example of a computing device having a merchant application and configured to be locatable by other devices.

FIG. 3 illustrates an example computing device 26, which may be embodied as a personal electronic device as illustrated in FIGS. 1 and 2 or may be adapted to provide the functionality of any computing device 26 utilized in the present disclosure. The example computing device 26 includes at least one processing unit, such as a processor 52, and at least one physical memory 62. The processor 52 may be, for example, a central processing unit, a microprocessor, a digital signal processor, an application-specific integrated circuit (ASIC), a field-programmable gate array (FPGA), a dedicated logic circuitry, a dedicated artificial intelligence processor unit, a graphics processing unit (GPU), a tensor processing unit (TPU), a neural processing unit (NPU), a hardware accelerator, or combinations thereof. The memory 62 may include a volatile or non-volatile memory (e.g., a flash memory, a random access memory (RAM), and/or a read-only memory (ROM)). The memory 62 may store instructions for execution by the processor 52, to the computing device 26 to carry out examples of the methods, functionalities, systems and modules disclosed herein.

The computing device 26 may also include at least one network interface 54 for wired and/or wireless communications with an external system and/or network (e.g., an intranet, the Internet, a P2P network, a WAN and/or a LAN). A network interface 54 may enable the computing device 26 to carry out communications (e.g., wireless communications) with systems external to the computing device 26, such as the server(s) 32, 36 shown in FIG. 1 or other computing devices 26.

The computing device 26 may optionally include at least one input/output (I/O) interface 60, which may interface with optional input device(s) 58 and/or optional output device(s). Input device(s) 58 may include, for example, buttons, a microphone, a touchscreen, a keyboard, camera, etc. Output device(s) may include, for example, a display 56 (as shown in FIG. 3), a speaker, etc. In this example, optional input device(s) 56 and optional output device(s) are shown internal to the computing device 26. In other examples, one or more of the input device(s) 58 and/or output device(s) may be an external component of the computing device 26.

To facilitate illustration of examples depicted in FIGS. 1 and 2, the computing device 26 in the example shown in FIG. 3 includes a merchant application 70, which may include a checkout function 72 to permit a user of the computing device 26 to participate in a checkout process. As indicated above, the merchant application 70 may generally refer to any application or app that is provided by a merchant associated with the retail environment 10 and may be used by an employee 20, 21 or customer 24 to participate in checkout processes and exchange other communications and data as described herein. That is, the merchant application 70 as utilized by an employee 20, 21 may include different (or additional) functionality when compared to a merchant application 70 used by the customer 24. The merchant application 70 or related functionality may, additionally or alternatively, be provided by an instance or page of an internet or web browser 74 and need not be limited to a custom or otherwise stand-alone app.

The computing device 26 shown in FIG. 3 may also include a location tracking module 68 to enable the computing device 26 to be locatable by the server device(s) 32, 36 and/or other computing devices 26 in the retail area 12. The location tracking module 68 may correspond to a tag (e.g., a UWB tag), a BLE module, a GPS transceiver, etc. While shown as being internal to the computing device 26, as with the input device(s) 58 and/or output device(s), the location tracking module 68 may instead be external to the computing device 26. Moreover, as note above, the computing device 26 may be locatable by other computing devices 26 without any available location tracking module 68, e.g., via image processing, WiFi connectivity, GPS, etc.

Referring now to FIG. 4, a flow chart is provided illustrating operations performed in providing proximity-aware information in a UI. At block 80, the merchant associated with the retail environment 12 causes a second computing device 26 (e.g., a customer's computing device 26) to be locatable by a first computing device 26 (e.g., an employee's computing device 26) while the second computing device 26 is being used to complete a checkout transaction.

By being locatable by the first computing device 26, at block 82, the first computing device 26 may display (in a UI), a list with entities that are operable to communicate with the first computing device 26, such as a list of customers 24 that are in locatable in the retail area 12 and are using their computing devices 26. These customer computing devices 26 in this example are locatable such that a proximity of the corresponding customer (second) computing device 26 can be determined and is indicated to the employee (first) computing device 26, e.g., in a UI that is used to execute a checkout transaction.

The second device(s) 26 may be locatable automatically by entering the retail area 12 (e.g., via a vision system or by running a merchant application 70), or may initiate such location tracking via some other input. For example, as shown in dashed lines in FIG. 4, the employee's computing device 26 may enable a checkout transaction to be initiated at block 84, e.g., by engaging and pairing with a customer's computing device 26 within the retail area 12. It can be appreciated that the checkout transaction may have already begun, e.g., while at the checkout counter 14, 15 in a line busting scenario. That is, the merchant may cause the second device(s) 26 to be locatable responsive to various inputs or triggers depending on the state of the transaction and/or the state of the customer's experience. For example, the location tracking may be initiated upon entering the retail area 12 when the merchant application 70 is running or has been opened.

Also shown in dashed lines in FIG. 4, at block 86, the UI displaying the list may enable the user of the first computing device 26 (e.g., employee) to select an entity from the list that indicates proximity to start a checkout transaction or access a pending checkout transaction. That is, the list may be populated with entities corresponding to the customer computing devices 26 before, during, or after a checkout transaction occurs such that the employee 20, 21 is able to determine relative proximity of the corresponding customer 24 and access data that is associated with that customer 24, to engage or re-engage in a checkout process. Moreover, block 86 may represent any optional interaction step in a checkout or other engagement process between the devices 26 once the proximity-related data is determined. For example, employees 20, 21 may be able to engage customers 24 that are roaming a retail area 12 before, during or after a shopping experience, whether or not a checkout transaction has occurred, is occurring, or will occur. That is, the proximity-related data determined within the retail area 12 may be leveraged for various interactions between devices, including the employee-customer interactions described herein. For example, the proximity-based mechanisms described herein may be extended to support interactive proximity-based in-store experiences and push marketing, among other things in addition to transactions. These mechanisms may also be used pre-checkout during in-store shopping, to aid staff in gaining insights into customer behavior such as knowing what areas of the shop customers interacted with, or offer tailored discounts based on past purchase behavior. Post-purchase push notifications may also be tailored to items/displays the customer interacted with.

FIGS. 5-15 illustrate example UIs, UI components and interactions from the perspective of an employee 20, 21 that includes a merchant application 70 running on a computing device 26 to enable interactions with customers 24 having computing devices 26 and being located within a tracked area such as the retail area 12 shown in FIG. 1.

Figures 5, 6:
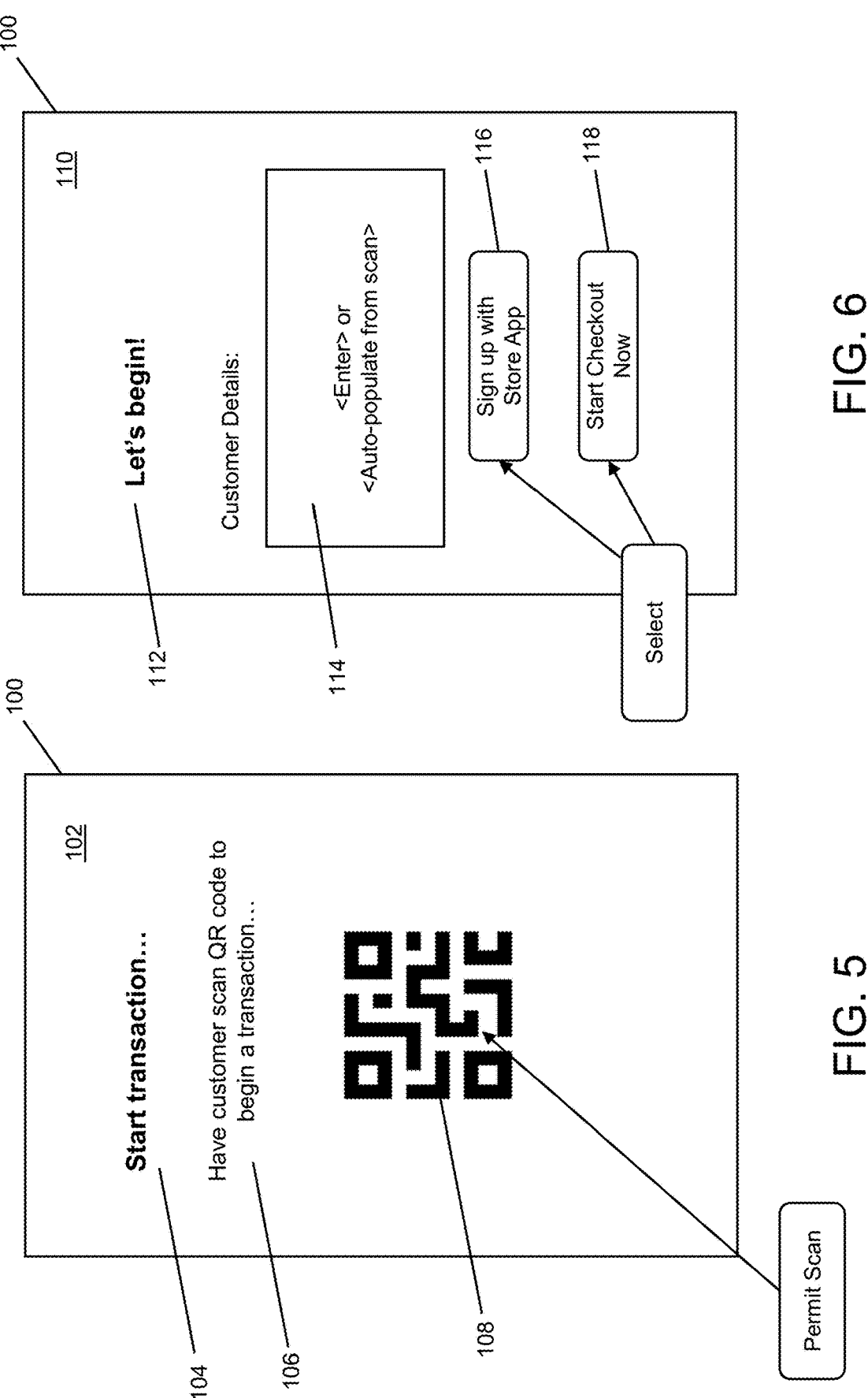
FIG. 5 shows an example of a user interface (UI) for enabling a checkout transaction to be initiated using machine-readable indicia.
FIG. 6 shows an example of a UI that is configured to obtain information from an entity engaged in a checkout transaction with the device displaying the UI.

Referring to FIG. 5, a merchant UI 100 is illustrated. In this example, the merchant UI 100 provides a checkout initiation page 102. The initiation page 102 may include a page header 104 describing the purpose of the page 102 and instructional text 106 to indicate the operation that may be performed using the page 102. In this example, the page 102 displays machine-readable indicia such as a QR code 108 as illustrated. It can be appreciated that other identifiers, including other machine-readable indicia such as bar codes, alpha, numeric, or alpha-numeric codes, etc.; may be displayed. Such identifiers enable a second computing device 26 utilized by a customer 24 to engage in a session with the employee's computing device 26, e.g., by pairing with that device or otherwise triggering the execution of a checkout transaction that involves the execution of steps in a transaction process, which may include the exchange of information between computing devices 26 as illustrated herein.

In this example, the QR code 108 may be presented to a customer 24 to have them scan the QR code 108, e.g., using a camera application on their computing device 26. It can be appreciated that with other machine-readable indicia such as a code, the code may be read and entered by the customer 24 into their merchant application 70. The QR code 108 in this example may be used to introduce a semi-automated pairing process. Similar semi-automated pairing may include NFC tapping between computing devices 26, etc. These pairing or communication establishment operations may be used in a line busting scenario wherein a customer running the merchant application 70 may exit the line 22 to begin a checkout transaction with a roaming employee 21. In another scenario, a roaming employee 21 may engage with a roaming customer 24 within the retail area 12 and initiate a checkout transaction to bypass or otherwise avoid using the line 22. For example, a customer 24 may interact with an employee 21 on the floor to ask a question or use a fitting room after which they may initiate a checkout transaction to expedite completion of their shopping experience to avoid a traditional checkout line 22.

FIG. 6 illustrates an example of a customer entry page 110 that may be displayed by the merchant UI 100 subsequent to a successful scanning of the QR code 108 and pairing or other communication establishment between the employee's computing device 26 and the computing device 26 used by the customer 24. The page 110 in this example includes a page header 112 to indicate that the checkout transaction has begun and a customer details portion 114. The customer details portion 114 may include a number of fields or other elements that provide customer information, such as name, username, contact information, loyalty number, etc. The data that is provided in the customer details portion 114 may be entered by the employee 20, 21, or by the customer 24, or may be automatically populated by initiating a data transfer between computing devices 26 or obtained during a pairing process or in connection with scanning the QR code 108.

For example, after successfully scanning the QR code 108, the customer's computing device 26 may be given a port, address, or short-range connection, which can be used to send the customer details to be populated in portion 114. The customer details may be provided by the merchant application 70 or some other data source, including manual entry. For example, the customer 24 may scan the QR code 108 to initiate a checkout transaction as a guest and may not already be associated with the merchant application 70. As such, as shown in FIG. 6, the page 110 may include a sign up option 116 to enable the employee 24 to initiate an account sign up process, e.g., to direct the computing device 26 of the customer 24 to download an app, enter a username, choose a password, etc. The page 110 in this example also includes a start checkout option 118 that may be selected as shown to initiate the checkout transaction process.

In embodiments, selecting the option 118 may enable a computing device 26 of the employee 20, 21 to scan or otherwise enter items that the customer 24 wishes to purchase. This may be manual, semi-manual or automatic and may or may not involve a merchant application 70 on the customer's computing device 26. For example, the customer 24 may present items to a connected POS device coupled to the employee's computing device 26 to permit a traditional checkout process. In other embodiments, the checkout process may be relatively more complex and include participation of both employee and customer computing devices 26, e.g., by handing off process steps to the customer's computing device 26 to permit multitasking as noted above.

Figures 7, 8:
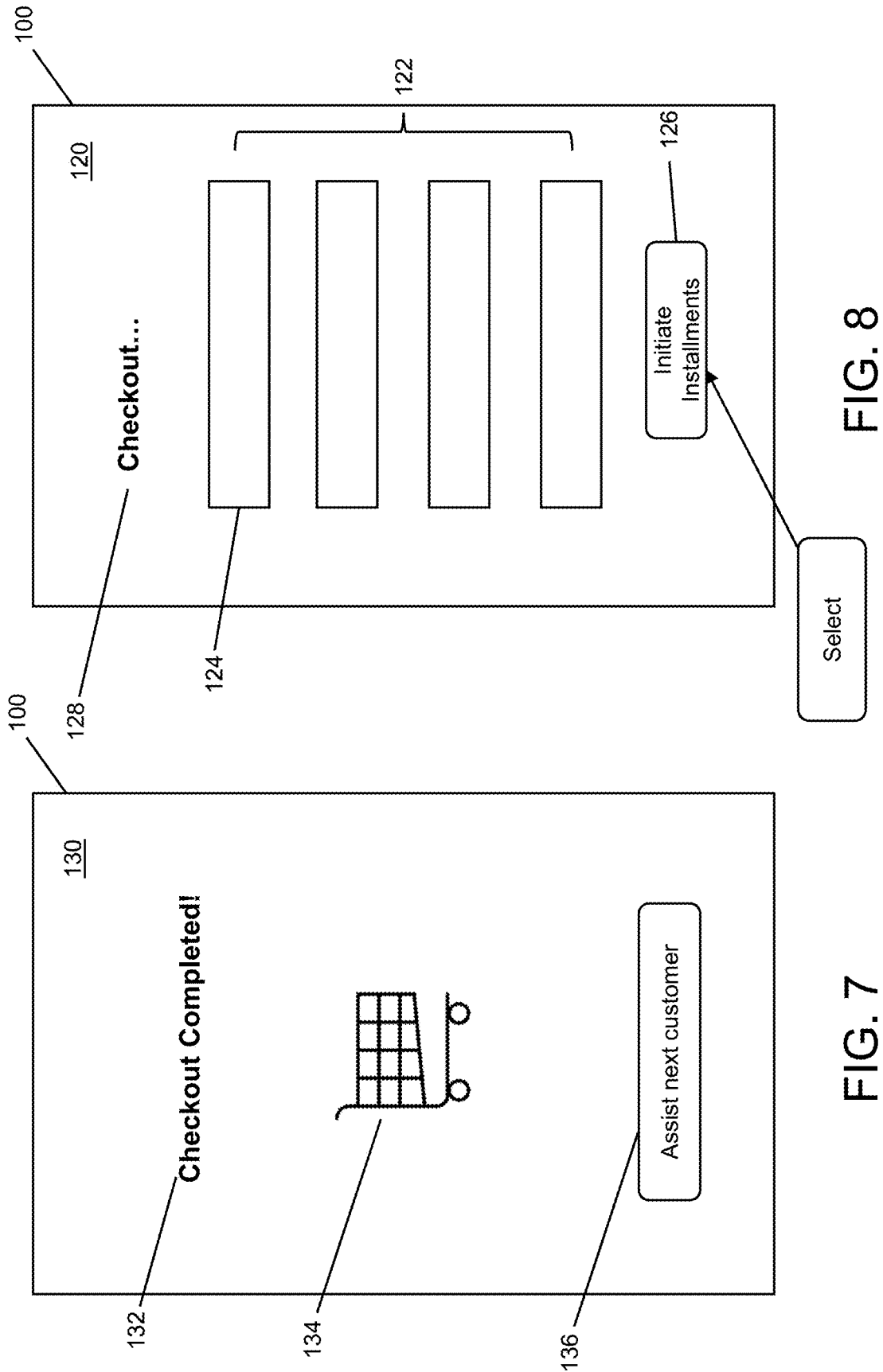
FIG. 7 shows an example of a UI for a completed checkout with an option to transition to an interaction with another entity.
FIG. 8 shows an example of a UI for a checkout page.

The checkout transaction may be implemented in an end-to-end manner such that a series of steps are taken to complete the checkout without multitasking. For example, as shown in FIG. 7, a completed checkout page 130 may be displayed upon completion of a checkout. The page 130 includes a page header 132 and in this example includes a shopping cart icon 134 to signify the checkout process. To enable the employee 20, 21 to move on to another checkout, a next customer option 136 may be provided. Selection of the option 136 may cause the QR code 108 to be displayed again to allow the employee 20, 21 to repeat the process in a serial manner, or may allow the employee 20, 21 to navigate back into a pending transaction when multitasking. Such multitasking examples are provided below.

Figures 9, 10:
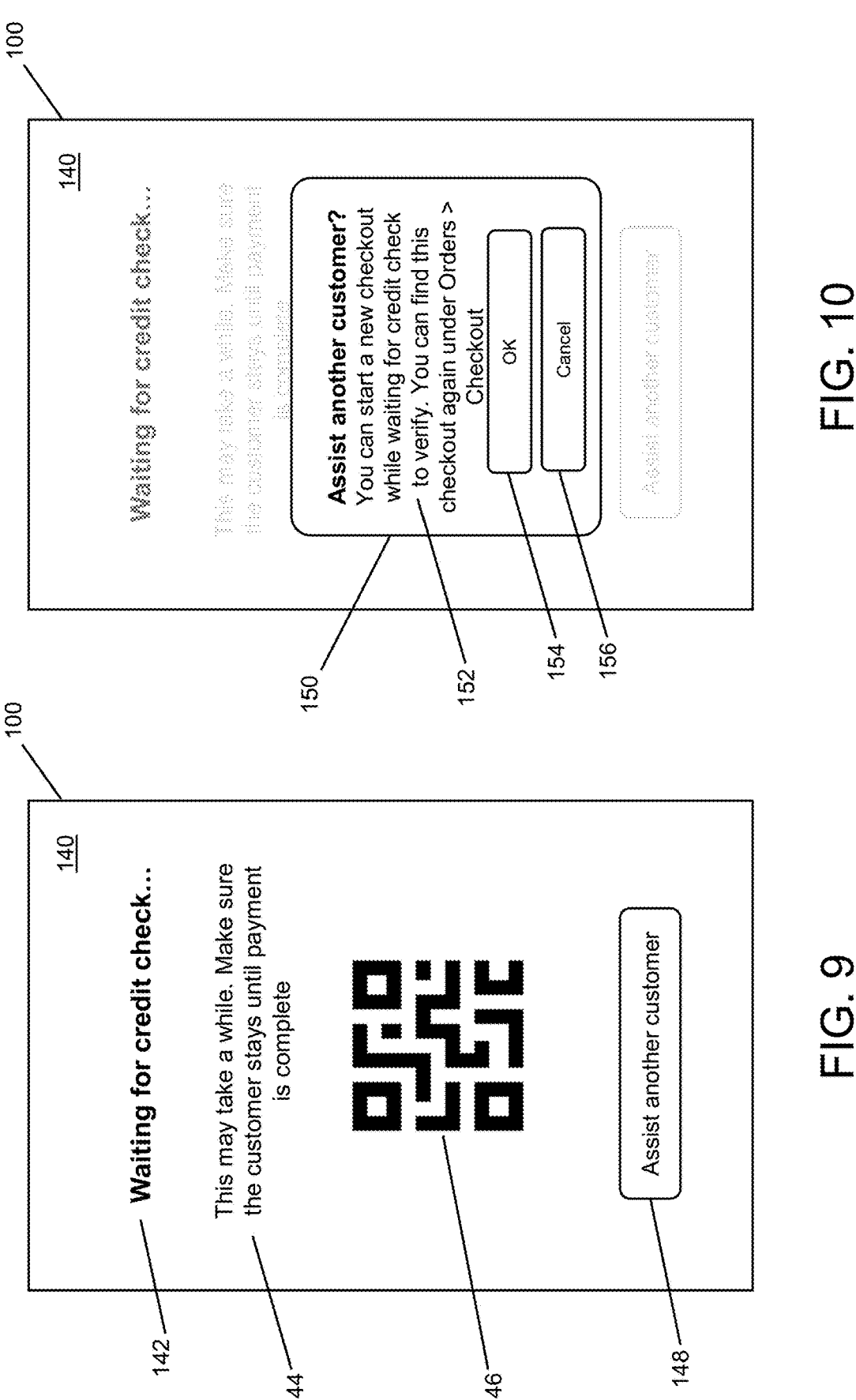
FIG. 9 shows an example of a UI for enabling a user to transfer from one transaction to another transaction.
FIG. 10 shows an example of a UI for confirming a transfer to another transaction.

Referring now to FIG. 8, prior to a completed checkout process, the UI 100 may display a checkout payment page 120. The payment page 120 includes a page header 128 and a list 122 of items 124 to be purchased at checkout. In this example, rather than accept a direct and immediate payment thus leading to page 130 shown in FIG. 7, the page 120 may include an installments option 126, which is an example of a checkout process step that can introduce delays and may benefit from the ability to multitask. Following this example, by selecting option 126, a handoff page 140 may be displayed as shown in FIG. 9. The page 140 in this example includes a "waiting for credit check" header 142 and message 144, which indicate to the employee 20, 21 that a waiting period may occur. A handoff QR code 146 may also be displayed as shown in FIG. 9, to enable the employee's computing device 26 to handoff at least one step in the checkout process to the computing device 26 used by another customer 24. For example, rather than have the employee 20, 21 enter information to complete the credit check, the employee 20, 21 may initiate a handoff of the process to the customer 24 to have them enter the necessary information and to communicate with a third party or any other required step to complete that stage in the checkout process. In this way, rather than holding up the employee's computing device 26 while the customer completes the time consuming step(s) on the customer device (e.g., after scanning the QR code 146), the computing device 26 is available for other operations and/or to display buyer information. Similar steps that may be time consuming include, for example, pre-qualifying for installments or entering ship-to-home details that can take time to enter all address information. In this way, should that stage require several minutes to complete, the employee 20, 21 may select an assist another option 148 to navigate to another customer's transaction, e.g., based on proximity as herein described.

FIG. 10 illustrates a prompt 150 that may be displayed while showing page 140 in order to confirm that the employee 20, 21 does intend to navigate to another checkout transaction. In this example, a message 152 instructs the employee 20, 21 how to navigate back into the current transaction (that has just handed off control to the customer 24). An ok option 154 and a cancel option 156 may be provided as shown to allow the employee 20, 21 to confirm or deny the requested navigation operation.

Figures 11, 12A, 12B:
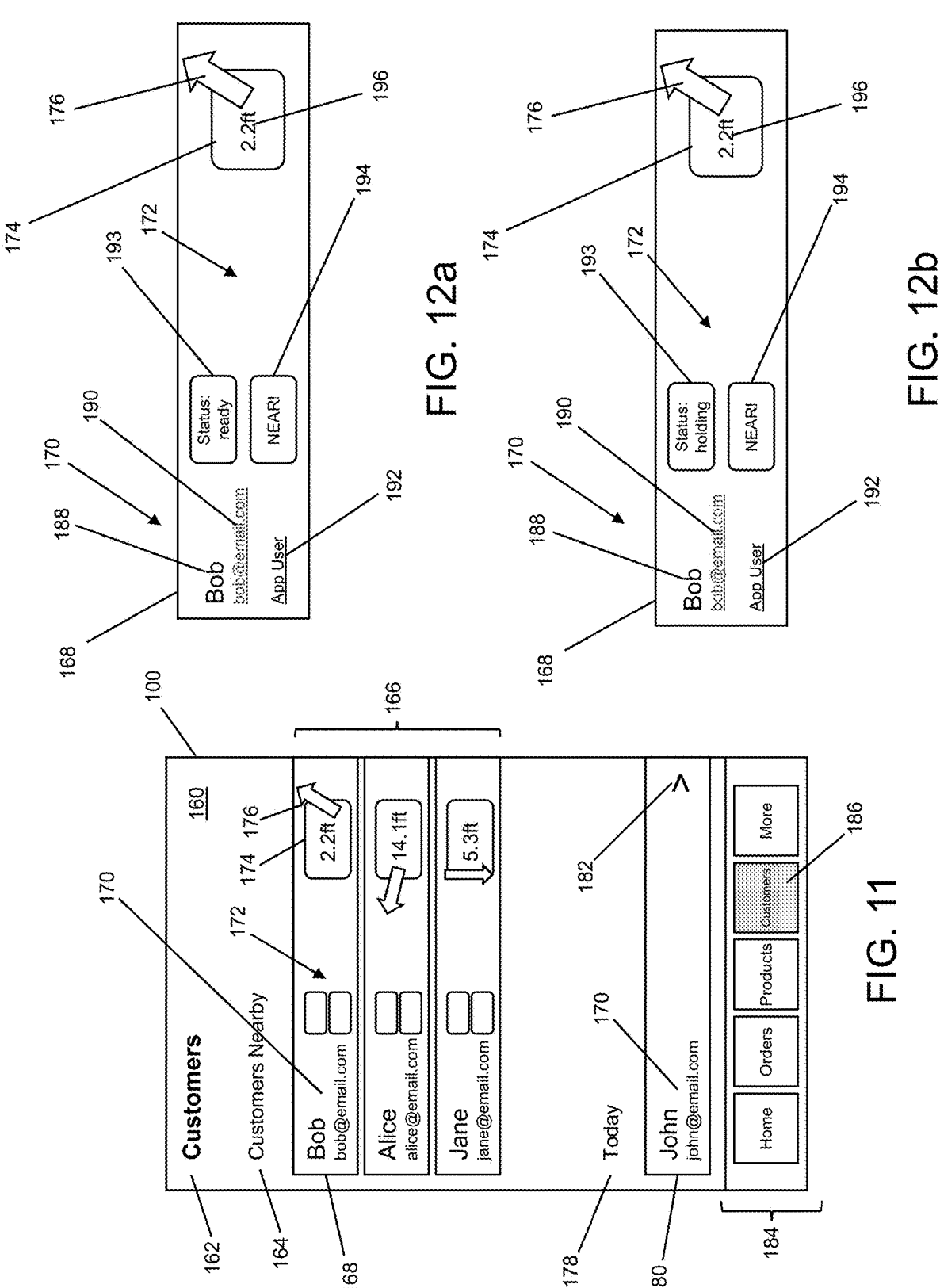
FIG. 11 shows an example of a UI for a list of locatable entities with proximity indicators provided for each entity.
FIGS. 12a and 12b are enlarged views of a list entry from the list shown in FIG. 11.

Referring now to FIG. 11, a customer list page 160 may be displayed to enable the employee 20, 21 to determine which customer 24 to assist next. The page 160 includes a page header 162 and a nearby customers sub-header 164 to identify a list 166 of entities (in this example customers 24) that are within the retail area 12 or other tracked area or zone. Each entity in the list has a list entry 168, which may include one or more tags 172 to provide status and other information, and a proximity indicator 174. The proximity indicator 174 in this example includes a directionality element 176, which may be displayed to show a customer's location relative to the employee 20, 21 based on a relative directionality of the computing devices 26 used by the entities as well as a distance value 196 (see also FIGS. 12a, 12b).

As illustrated in FIG. 11, the page 160 may display a history portion under sub-header 178 to allow entities associated with recent checkout transactions to be selected, e.g., for follow-up messages or notifications such as to fill out a survey, receive a coupon for a next visit, etc. It can be appreciated that the entry 180 shown in FIG. 11 may have previously been displayed under sub-header 164 when that customer 24 was in the retail area 12 and/or during a pending checkout transaction and moved under sub-header 178 once completed or a shopping session has finished. It can also be appreciated that the entry 180 may move back up under sub-header 164 if the corresponding customer 180 re-enters the retail area 12 or later begins a checkout transaction. Entries 180 displayed under sub-header 178 also enable the employee 20, 21 to contact customers at different times and this list may be prioritized based on customer activities or other metrics. The UI 100 in this example includes a number of tabs 184, which provides a customer tab 186 that may be selected to display page 160 and allows the employee 20, 21 to navigate to and from the customer list 168 as they utilize the merchant application 70.

The list entry 168 may include user details 170, such as a username, which may be used to identify the customer 24 and/or to initiate a communication with that customer 24. FIG. 12a illustrates the list entry 168 in an enlarged view to show additional details. In this example, the user details 170 includes a name 188, an email address 190 (which may correspond to a username in some embodiments), and a customer status 192. The customer status 192 may be used to identify the customer 24 as a user of the merchant application 170 as in this example, or other status indicators such as loyalty member, loyalty level, frequent customer, new customer, etc. Example tags 172 are also shown in FIG. 12a. In this example, a transaction status tag 193 is displayed, which may be used to indicate that the customer 24 is ready for a current or next step in the checkout transaction or may provide the exact status of the transaction (e.g., indicate the exact stage they are in). A proximity tag 194 is also displayed in this example, which may be used to indicate a proximity status relative to other customers 24. For example, a "near" proximity may be used to indicate to the employee 20, 21 both transaction- and distance-related statuses to assist in determining which customer 24 to approach next. It can be appreciated that the proximity-based status information may also be included is a customer-facing application, e.g., to allow a customer to locate a staff member, the checkout counter, a product, a fitting room, etc. That is, the principles discussed herein may be applied to both employee-facing and customer-facing applications.

The proximity indicator 174 shown in FIG. 12a provides both a distance value 196, in this example 2.2 ft, and a directionality element 176. The directionality element 176 in this example is embodied graphically using arrow pointing substantially towards the computing device 26 used by the corresponding customer 24. The values used by the proximity indicator 174 may be obtained by a location tracking system such as the UWB system illustrated in FIG. 2.

Referring again to FIG. 11 it can be seen that the directionality element 176 may include arrows for each list entry 168 to provide an ability to directly compare the relative distances of each customer 24. The proximity indicator 174 may be used with the tags 172 to prioritize which customer 24 to approach when multitasking checkout processes. The order of the list entries 168 may, additionally or alternatively, be automatically ordered or reordered based on these metrics. For example, as customers 24 change relative distances 196 or are at different stages in the transaction process, the entries 168 may be reordered. Weights may be applied to these metrics such that, for example, transaction status has a higher weight than distance or direction, or vice versa. Any such weights or rules applied to the ordering and reordering may differ based on the retail environment 10, layout of the retail area 12, type of retail category, etc. For example, a large store may apply a lower weight to distance than transaction status.

FIG. 12*b* illustrates the same list entry 168 as FIG. 12*a* with a different transaction status tag 193. In FIG. 12*b*, the status indicates "holding", which suggests that Bob is still performing a step in the checkout process whereas in FIG. 12*a* the status indicates "ready", which suggests that Bob is waiting to be assisted further. As such, in the employee 20, 21 can prioritize Bob in the scenario depicted in FIG. 12*a* but may continue with or move to another customer 24 in the scenario depicted in FIG. 12*b* due to transaction status, even though in both cases Bob is deemed to be nearby.

Figures 13A, 13B:
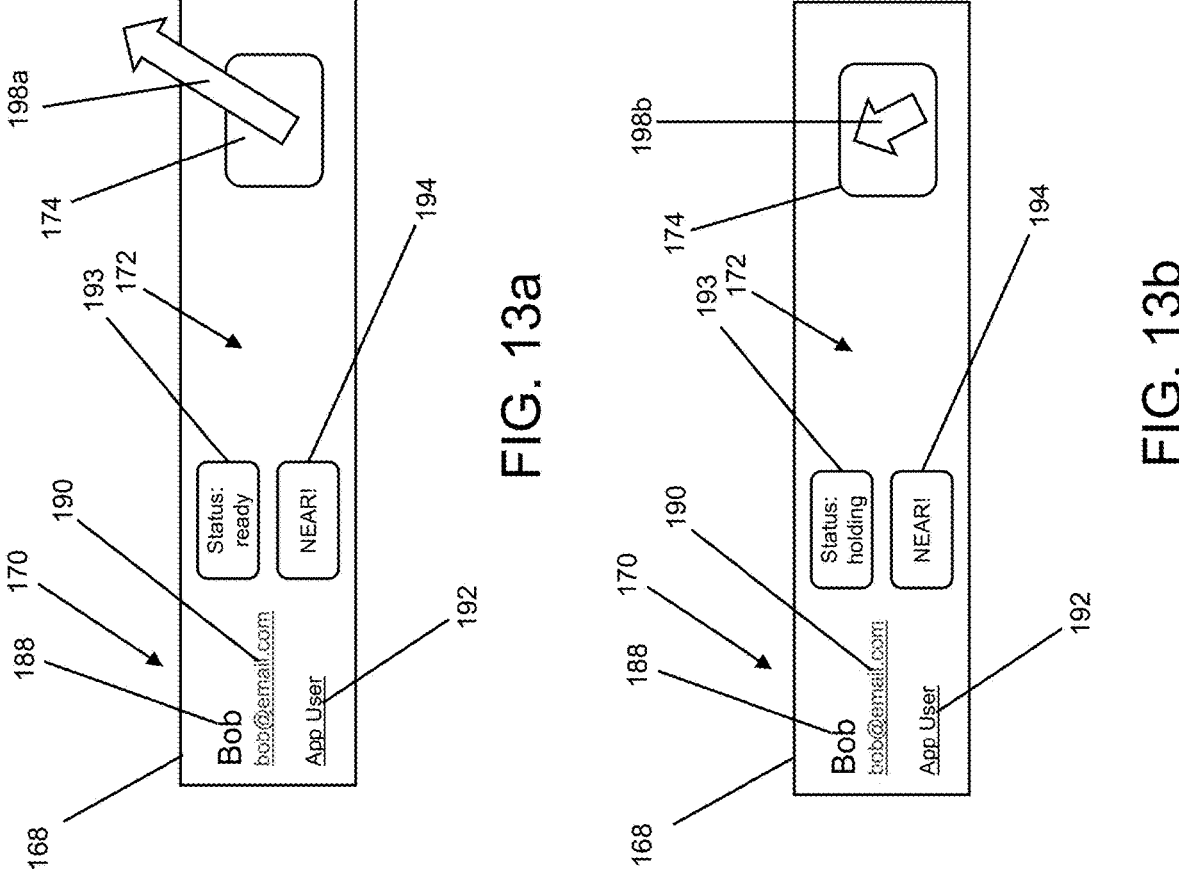
FIGS. 13a and 13b are enlarged views of a list entry in another example.

The proximity indicator 174 shown in FIGS. 11, 12*a*, and 12*b* is only one example. Referring now to FIG. 13*a*, the proximity indicator 174 may utilize a single arrow graphic 198*a* to indicate both relative distance and directionality based on the length of the arrow graphic 198*a*. When compared to the example in FIG. 13*b*, it can be seen that Bob is closer in the scenario depicted in FIG. 13*b* than in FIG. 13*a* and to the left rather than to the right. As such, a numerical value is not required to provide a proximity indicator 174 that may be compared to other proximity indicators 174 to determine a relative distance and/or relative direction of a customer 24.

In some embodiments (not shown), the proximity indicator 174 may, additionally or alternatively, be provided in a merchant application 70 utilized by the customer 24. That is, while the examples shown in FIGS. 11-13 illustrate the list entries 168 for customers 24, the merchant application 70 used by the customer 24 may similarly utilize proximity values such as distance and/or directionality to determine which employees 20, 21 are relatively closer, are relatively busier, among other things (e.g., to allow a customer to locate a staff member, the checkout counter, a product, a fitting room, etc.), to permit the customer 24 to determine which employee 20, 21 to approach to initiate or continue with a checkout transaction.

Figure 14:
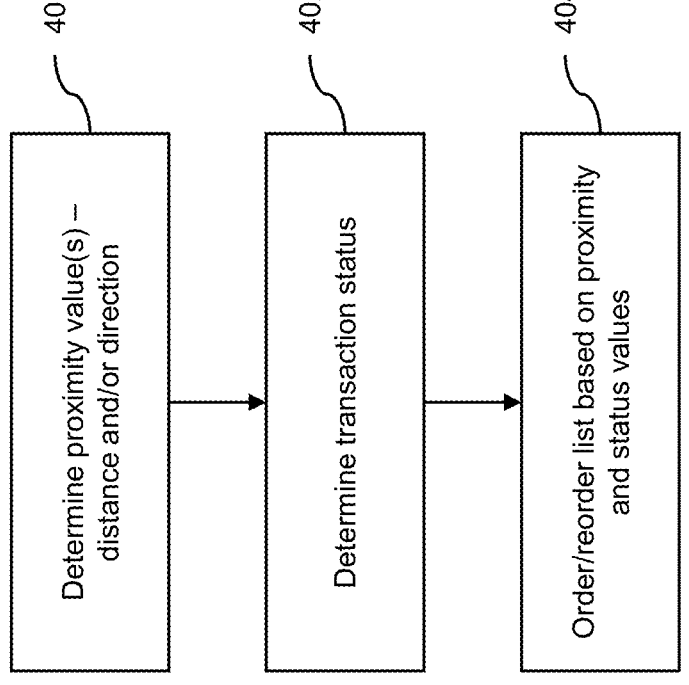
FIG. 14 is a flow chart illustrating example operations for ordering a list of entities using proximity and transaction status values.

Referring now to FIG. 14, a flow chart is provided illustrating operations performed in ordering (or reordering) the entity list 166 shown in FIG. 11. At block 400, the merchant application 70 determines the proximity value(s) from a location tracking system coupled to the computing device 26, that is, a distance value and/or a value indicative of directionality.

At block 402, the merchant application 70 determines the transaction status for each entity in the list 166.

Based on a set of weights or rules (which may include the application of such weights), the merchant application 70 determines an ordering for the entries 168 in the list 166 and orders or reorders the list 166 accordingly at block 404. The process illustrated in FIG. 14 may be applied periodically, continuously, or in response to a trigger such as the receipt of updated proximity and/or transaction status data from other computing devices 26 or a location tracking system.

Figures 15, 16:
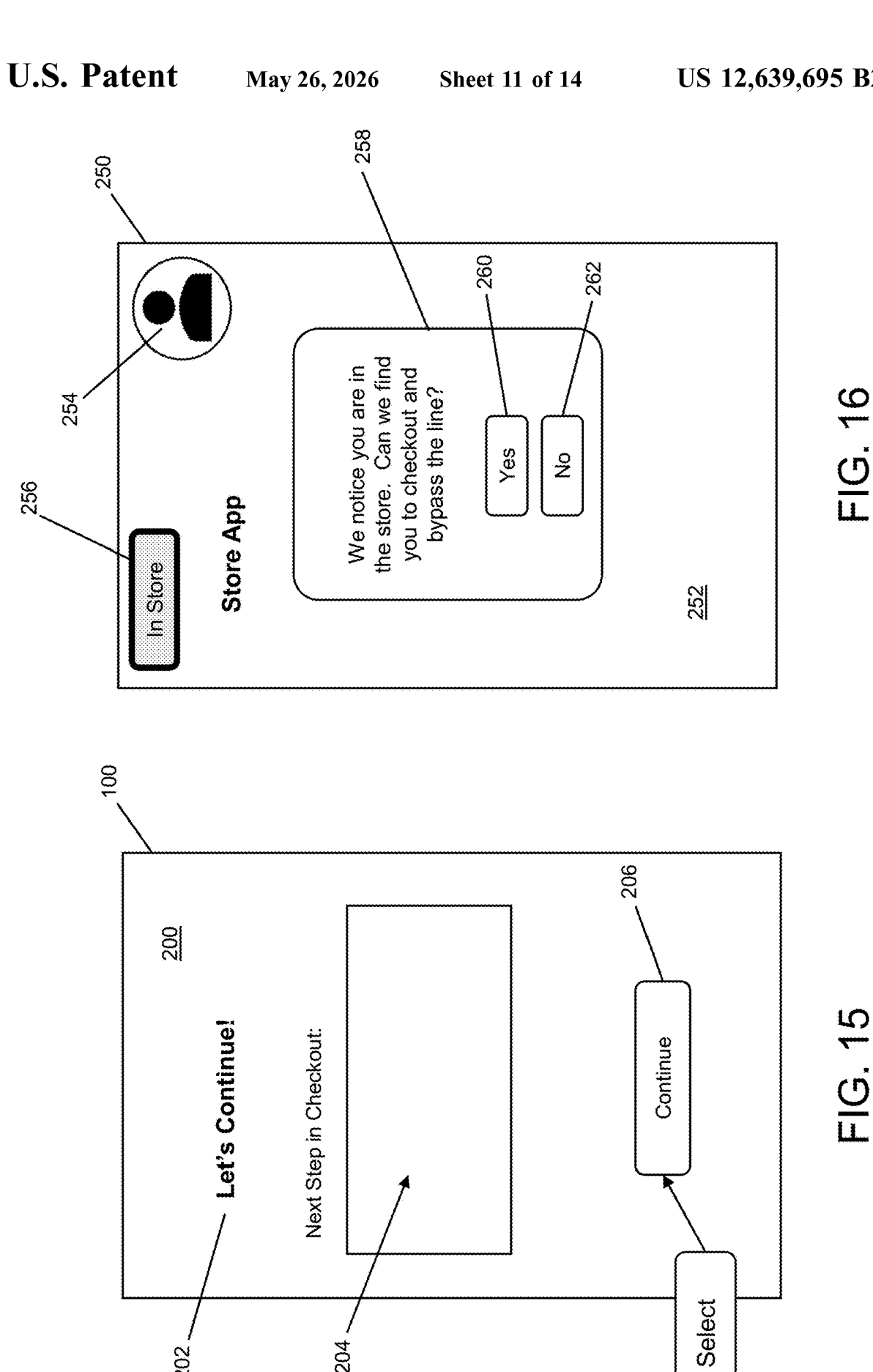
FIG. 15 shows an example of a UI for engaging in the next step in a checkout transaction.
FIG. 16 shows an example of a store app UI for participating in a checkout transaction and displaying a notification received from a checkout device.

Referring again to FIG. 11, the entries 168 in the list 166 may be selectable, such that the employee 20, 21 may navigate to and from different transaction processes from one convenient location and utilize the proximity and/or transaction status information provided therein to determine where to prioritize their multitasking. For example, the employee 20, 21 may select an entry 168 from the list 166 to participate in the next step in the checkout process. FIG. 15 illustrates a transaction page 200 that provides a page header 202 indicating that the process has resumed and a next checkout step portion 204 to enable the next step in the checkout process to be completed. For example, after being approved for the installment plan as illustrated in FIGS. 9 and 10, a shipment or billing address may be required and entered into portion 204. A continue option 206 may be selected to proceed to another step or complete the checkout transaction.

FIGS. 16-20 illustrate the merchant application 70 configured to be used by the customer 24. For example, a store associated with a merchant may have an app that they use for issuing loyalty points, enabling online purchases and, as in this example, to complete a checkout process while in store. Referring to FIG. 16 a store app UI 250 is shown which includes a profile option 254 for the customer 24 to enter and update their profile information and an in store indicator 256, which may be displayed or highlighted when the customer 24 is using the store app UI 250 and physically enters the retail area 12. In this example, a prompt 258 is displayed that welcomes the customer 24 to the retail area 12 and informs them of an option to checkout using the app UI 250 to bypass a line 22. The prompt 258 provides a "yes" option 260 and a "no" option 262 to allow the customer 24 to opt in or decline the checkout transaction process via merchant application 70.

Figures 17, 18:
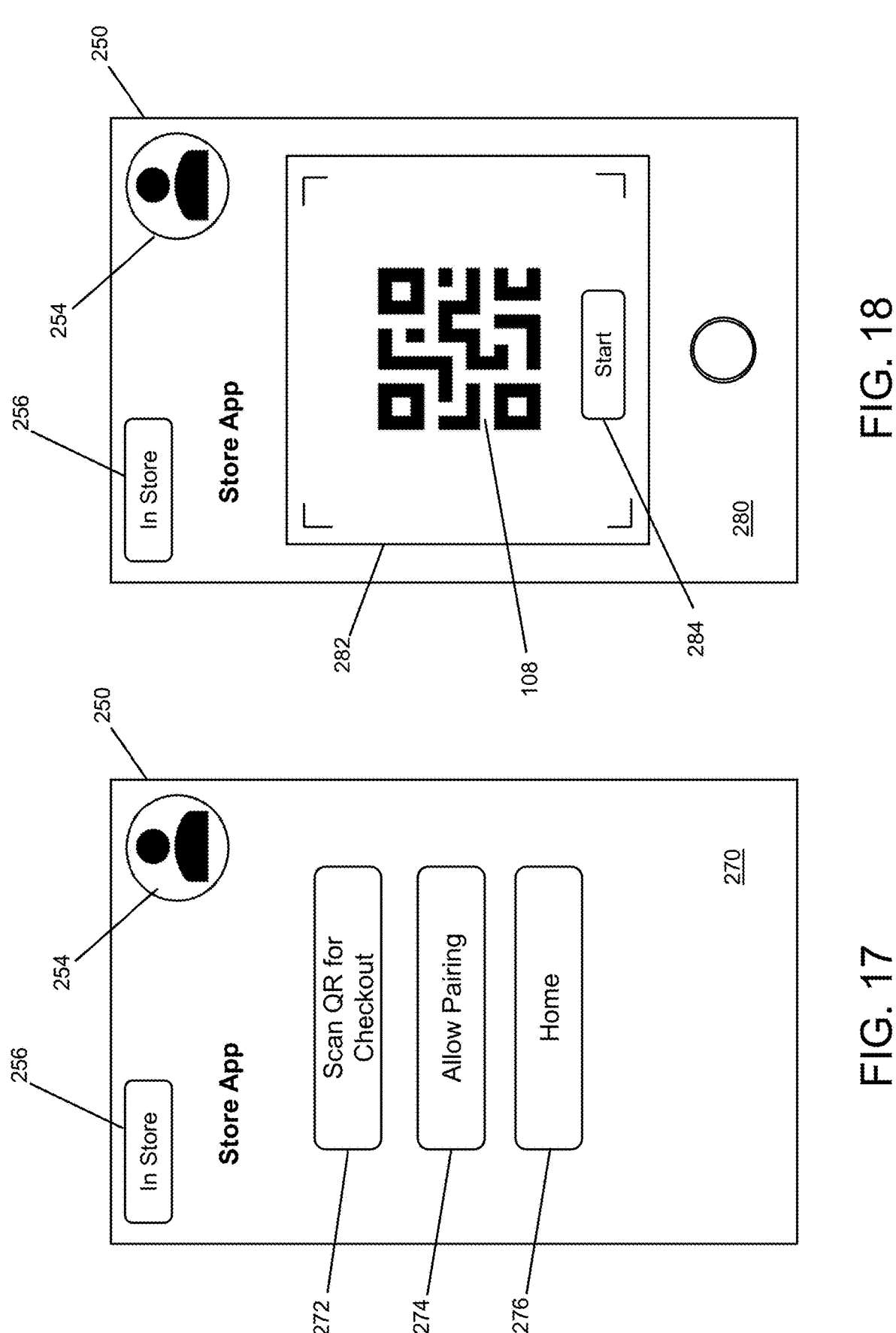
FIG. 17 shows an example of a UI for selecting options for engaging in a checkout transaction.
FIG. 18 shows an example of a UI for scanning machine-readable indicia to initiate or resume a checkout transaction.

FIG. 17 illustrates a checkout options page 270, which may be displayed when detecting selection of the "yes" option 260 in FIG. 16. In other embodiments, the page 270 may be accessible by the customer 24 without receiving a prompt 258. In this example, the page 270 provides a scan option 272 to allow the customer 24 to scan, for example, the employee's QR code 108 as illustrated in FIG. 18. The page 270 also provides a pairing option 274, which may be used to initiate another pairing option such as a NFC tap or other short-range communication to electronically couple the computing devices 26 that are to be participating in a checkout transaction process. Also shown in FIG. 17 is a home option 276, which may be selected to return to a home screen of the app UI 250. It can be appreciated that where short-range communication options are unavailable or incompatible, other long-range communication options such as email, text or push notification may instead be employed.

FIG. 18 illustrates that a camera viewing window 282 may be launched within a scanning page 280 of the app UI 250 to permit the customer 24 to scan the QR code 108 being displayed by the employee 20, 21 using their computing device 26. It can be appreciated that such a camera may be considered both an input device 58 and a display 56 per the configuration shown in FIG. 3. The camera window 282 may display a start option 284 that is selectable when the camera is able to read the QR code 108 to initiate a checkout transaction process with the employee 20, 21.

Figures 19, 20:
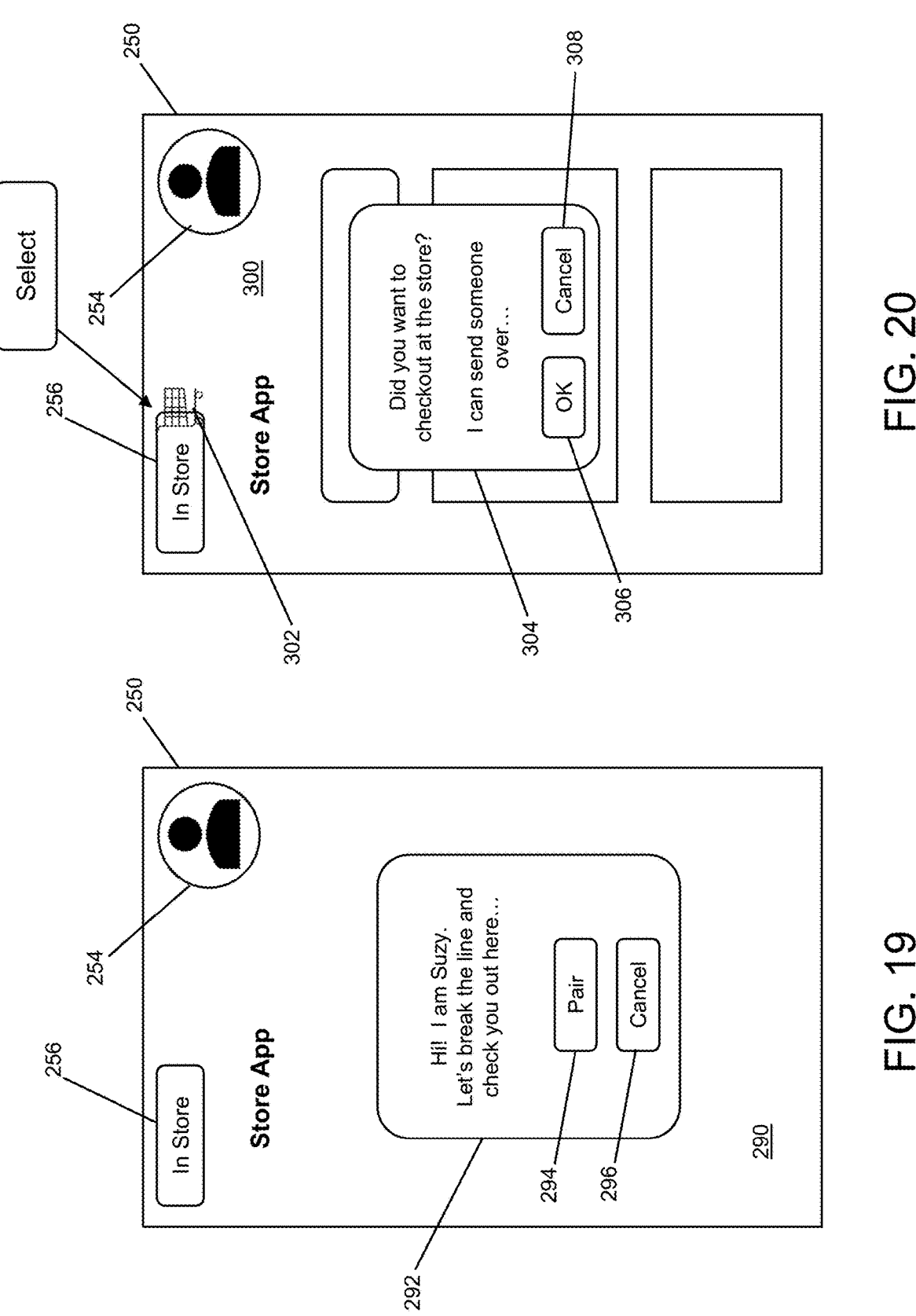
FIG. 19 shows an example of a store application UI displaying a pairing request from a checkout device.
FIG. 20 shows an example of a UI for initiating a request to participate in a checkout transaction from a store app.

FIG. 19 illustrates a pairing page 290 displayed by the app UI 250, which includes a pairing prompt 292 displayed in response to receiving a pairing request from a nearby computing device 26 used by an employee 20, 21. For example, an employee 20, 21 may ping nearby customers 24 that are running the merchant application 70 to initiate a pairing request such as that shown in FIG. 19. In this example, the prompt 292 includes a pairing request message suggesting that the customer 24 break the line 22 and be checked out elsewhere. A pair option 294 allows the customer 24 to initiate the pairing and a cancel option 296 allows the customer 24 to decline the pairing. As such, it can be appreciated from FIG. 19 that various pairing processes may be used to couple computing devices 26 for the checkout transaction process.

FIG. 20 illustrates a checkout page 300 with a checkout summon option 302. In this example, the customer 24 may proactively initiate a checkout transaction that is outside of a line 22 by selecting option 302. By selecting option 302, a prompt 304 may be displayed asking the customer 24 whether they are ready to checkout and to have an employee 21 find them. Selecting an "ok" option 306 initiates finding an employee 21 to assist and selecting a "cancel" option 308 allows the customer 24 to decline.

By selecting the ok option 306, the UI 100 may create a list entry 168 for page 160 and update a tag 172 to indicate that the customer is ready. In other embodiments, an additional tag 172 may be displayed to indicate that the customer 24 has requested assistance, which may be used to allow the employee 21 to prioritize that customer 24.

While not shown in FIG. 11, the list 166 of entities may include other employees 20, 21 in addition to customers 24. For example, the list 166 may include an entry 168 for another employee 20, 21 which also provides a proximity indicator 174 to permit the employee 20, 21 displaying the page 160 to determine if another employee 20, 21 is available and relatively close to a particular customer 24 in the list 166. In other embodiments, a separate list (not shown) may be provided with other employees 20, 21 for the same purpose. The entries 168 for other employees 20, 21 may include an option to contact that employee or to share an entry 168 to allow them to take over the process. As such, the proximity indicator 174 may be applied to any type of entity in the retail area 12 that may participate in a checkout transaction process.

Figure 21:
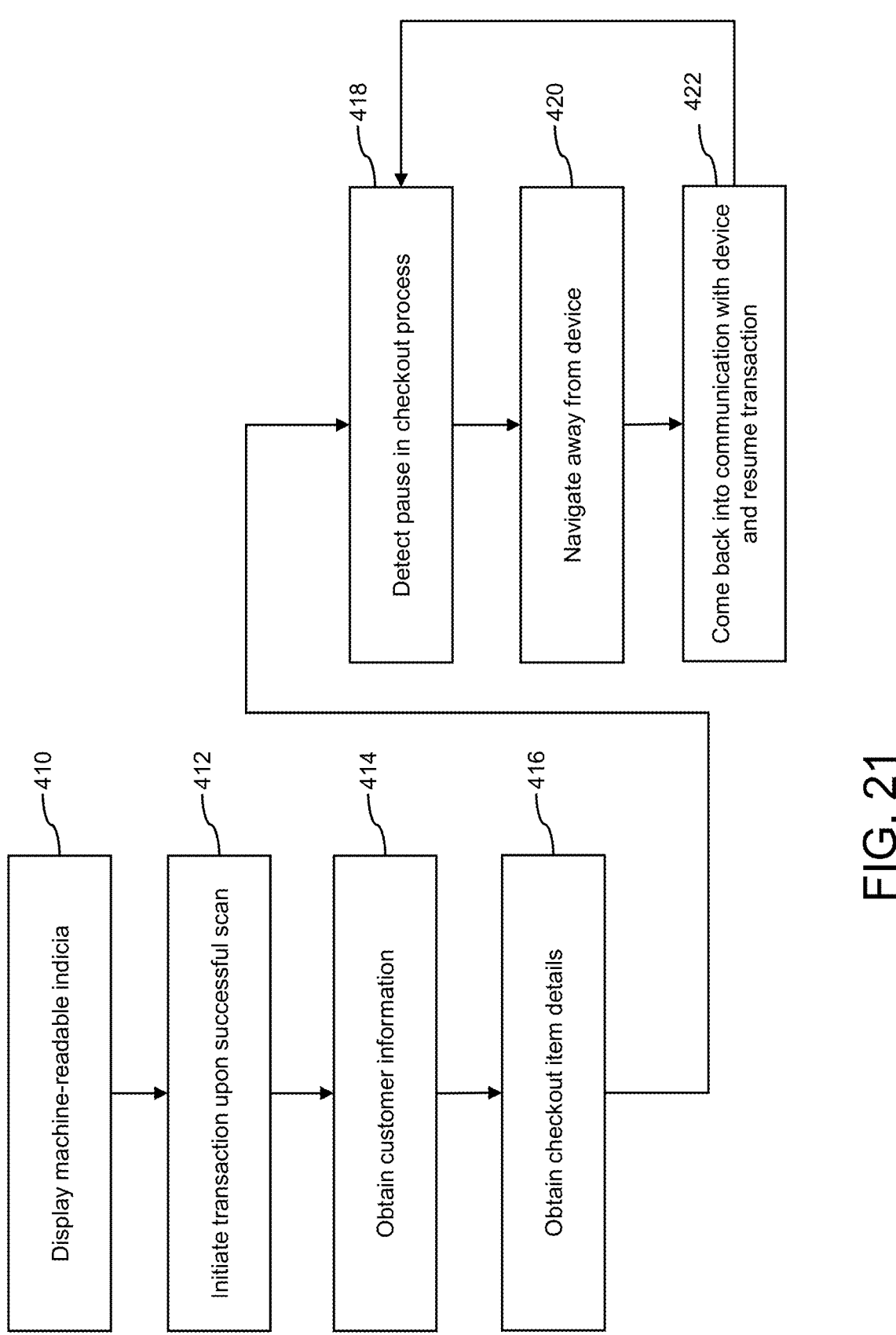
FIG. 21 is a flow chart illustrating example operations for participating in a checkout transaction.

Referring now to FIG. 21, a flow chart is provided illustrating operations for participating in a checkout transaction process, in one example. At block 410, the merchant application 70 displays machine readable indicia such as the QR code 108. Upon a successful scanning of the machine-readable indicia at block 412, e.g., by receiving a message from a computing device 26 that has scanned the QR code 108, the transaction may be initiated. In this example, customer information may be obtained at block 414, e.g., to enable the list entry 166 to be created in the merchant application 70.

At block 416, checkout item details may be obtained, e.g., by entering or scanning items that the customer 24 intends to purchase or return as part of the checkout transaction process.

At block 418, the merchant application 70 detects a pause in the checkout process, which may be done automatically or as prompted by the employee 20, 21 as shown in FIGS. 9-10.

At block 420, the employee 20, 21 navigates away from one computing device 26 to another computing device 26, e.g., by accessing the list 266 shown in FIG. 11. At a later time, e.g., when the customer 24 comes back into proximity or progresses in a transaction step that has been handed off to them, at block 422, the computing device 26 comes back into communication with the computing device 26 associated with the customer 24 that was engaged in the transaction at block 414-418. The transaction may then be resumed e.g., by selecting a corresponding entry 268 in the list 266, or otherwise accessing a page for the corresponding checkout transaction. The merchant application 70 may allow the employee 20, 21 (or customer 24) to cycle through the operations shown in FIG. 21, e.g., by cycling back to block 418 when a further pause in the transaction process is detected.

For simplicity and clarity of illustration, where considered appropriate, reference numerals may be repeated among the figures to indicate corresponding or analogous elements. In addition, numerous specific details are set forth in order to provide a thorough understanding of the examples described herein. However, it will be understood by those of ordinary skill in the art that the examples described herein may be practiced without these specific details. In other instances, well-known methods, procedures and components have not been described in detail so as not to obscure the examples described herein. Also, the description is not to be considered as limiting the scope of the examples described herein.

It will be appreciated that the examples and corresponding diagrams used herein are for illustrative purposes only. Different configurations and terminology can be used without departing from the principles expressed herein. For instance, components and modules can be added, deleted, modified, or arranged with differing connections without departing from these principles.

It will also be appreciated that any module or component exemplified herein that executes instructions may include or otherwise have access to computer readable media such as transitory or non-transitory storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transitory computer readable medium which can be used to store the desired information and which can be accessed by an application, module, or both. Any such computer storage media may be part of the computing device 26, any component of or related thereto, etc., or accessible or connectable thereto. Any application or module herein described may be implemented using computer readable/executable instructions that may be stored or otherwise held by such computer readable media.

The steps or operations in the flow charts and diagrams described herein are provided by way of example. There may be many variations to these steps or operations without departing from the principles discussed above. For instance, the steps may be performed in a differing order, or steps may be added, deleted, or modified.

Although the above principles have been described with reference to certain specific examples, various modifications thereof will be apparent to those skilled in the art as having regard to the appended claims in view of the specification as a whole.

The invention claimed is:

1. A computer-implemented method, comprising:
initiating, by a first device, a pairing process to establish a communication connection between the first device and a second device, the second device operable to communicate with the first device;
responsive to the pairing process, having the first device handoff execution of at least one operation in a check-out transaction to the second device;
subsequent to the handoff of the checkout transaction, causing the second device to be locatable by the first device while the second device is being used to complete the at least one operation in the checkout transaction;
at the first device, determining a proximity value for the second device; and
at the first device, displaying a list comprising an entity associated with the second device, with an indication of proximity of that entity to the first device based on the proximity value.

2. The method of claim 1, wherein the proximity value comprises a distance of the second device relative to the first device.

3. The method of claim 2, wherein the proximity value comprises a direction of the second device relative to the first device.

4. The method of claim 1, wherein the proximity value comprises a direction of the second device relative to the first device.

5. The method of claim 1, wherein the list is ordered based at least in part on proximity values of a plurality of entities.

6. The method of claim 5, further comprising:
reordering the list based on the proximity value as the relative locations of the first device and any one of the plurality of entities changes.

7. The method of claim 1, further comprising:
exchanging data between the first device and the second device to conduct a next step in the checkout transaction.

8. The method of claim 1, further comprising:
responsive to an input at the first device selecting the entity in the list, sending a notification from the first device to the second device to initiate the checkout transaction.

9. The method of claim 1, further comprising:
displaying a transaction checkout user interface associated with the entity in the list when detecting selection of that entity from the list.

10. The method of claim 1, wherein the proximity value is determined by any one or more of the first device, the second device, or a third device operable to determine the proximity of the second device.

11. The method of claim 1, wherein each entity becomes visible on the list when running an application on the second device.

12. The method of claim 1, wherein the list is further displayed on at least one additional device, wherein the proximity value for each entity displayed on the at least one additional device is based on a location of the second device relative to the corresponding additional device.

13. The method of claim 12, further comprising:
filtering the list displayed on the first device and each additional device to display a subset of the entities, based on a role associated with the corresponding device.

14. The method of claim 1, wherein the list is ordered based at least in part on a stage of the checkout transaction being completed between the first device and a corresponding one of a plurality of second devices.

15. The method of claim 1, wherein the proximity value is determined using an Ultra Wide Band (UWB).

16. The method of claim 1, wherein a plurality of second devices are locatable by the first device while each of the plurality of second devices is being used to complete the checkout transaction, wherein each entity is associated with a corresponding second device operable to communicate with the first device, and wherein a plurality of indications of proximity are provided, based on a proximity value for the corresponding second device.

17. A system comprising:
at least one processor; and
at least one memory, the at least one memory storing processor executable instructions that, when executed by the at least one processor, causes the system to:
initiate, by a first device, a pairing process to establish a communication connection between the first device and a second device, the second device operable to communicate with the first device;
responsive to the pairing process, have the first device handoff execution of at least one operation in a checkout transaction to the second device;
subsequent to the handoff of the checkout transaction, cause the second device to be locatable by the first device while the second device is being used to complete the at least one operation in the checkout transaction;
at the first device, determining a proximity value for the second device; and
at the first device, display a list comprising an entity associated with the second device, with an indication of proximity of that entity to the first device based on the proximity value, the second device operable to communicate with the first device.

18. The system of claim 17, wherein the proximity value comprises a distance of the second device relative to the first device and/or a direction of the second device relative to the first device.

19. The system of claim 17, wherein the list is ordered based at least in part on proximity values of a plurality of entities.

20. The system of claim 19, further comprising instructions to:
reorder the list based on the proximity value as the relative locations of the first device and any one of the plurality of entities changes.

21. The system of claim 17, further comprising instructions to:
exchange data between the first device and the second device to conduct a next step in the checkout transaction.

22. The system of claim 17, wherein the list is further displayed on at least one additional device, wherein the proximity value for each entity displayed on the at least one additional device is based on a location of the second device relative to the corresponding additional device.

23. The system of claim 22, further comprising instructions to:

filter the list displayed on the first device and each additional device to display a subset of the entities, based on a role associated with the corresponding device.

24. The system of claim 17, wherein a plurality of second devices are locatable by the first device while each of the plurality of second devices is being used to complete the checkout transaction, wherein each entity is associated with a corresponding second device operable to communicate with the first device, and wherein a plurality of indications of proximity are provided, based on a proximity value for the corresponding second device.

25. A computer-readable medium storing processor executable instructions that, when executed by a processor, cause the processor to:

initiate, by a first device, a pairing process to establish a communication connection between the first device and a second device, the second device operable to communicate with the first device;

responsive to the pairing process, have the first device handoff execution of at least one operation in a checkout transaction to the second device;

subsequent to the handoff of the checkout transaction, cause the second device to be locatable by the first device while the second device is being used to complete the at least one operation in the checkout transaction;

at the first device, determining a proximity value for the second device; and at the first device, display a list comprising an entity associated with the second device, with an indication of proximity of that entity to the first device based on the proximity value, the second device operable to communicate with the first device.

\* \* \* \* \*